United States Patent
Rowse et al.

[11] Patent Number: 6,151,877
[45] Date of Patent: Nov. 28, 2000

[54] WHEEL RAKE HUB GUARD

[76] Inventors: Dan D. Rowse, 2315 N., Ord, Nebr. 68862; Ron A. Rowse, HC 80 Box 43, Burwell, Nebr. 68823

[21] Appl. No.: 09/247,491

[22] Filed: Feb. 10, 1999

[51] Int. Cl.$^7$ .................................................. A01D 26/00
[52] U.S. Cl. .............................................. 56/372; 56/400
[58] Field of Search ................... 56/12.4, 400, 400.02, 56/400.04, 400.11, 400.16, 400.21, 16.1, 372, 377, 387, 367, 376, DIG. 27

[56] References Cited

U.S. PATENT DOCUMENTS

| | | | |
|---|---|---|---|
| 3,841,073 | 10/1974 | Van Der Lely | 56/370 |
| 3,975,892 | 8/1976 | Hellkuhl | 56/365 |
| 4,158,972 | 6/1979 | Chamberlain | 74/801 |
| 4,198,805 | 4/1980 | Gerlinger | 56/370 |
| 4,324,093 | 4/1982 | Van Der Lely et al. | 56/377 |
| 4,345,422 | 8/1982 | Amstutz | 56/370 |
| 4,584,828 | 4/1986 | Bentley et al. | 36/377 |
| 4,961,485 | 10/1990 | Huff et al. | 192/4 A |
| 6,068,349 | 3/2000 | Henderson et al. | 301/61 |

*Primary Examiner*—Robert E. Pezzuto
*Assistant Examiner*—Arpad Fabian Kovacs
*Attorney, Agent, or Firm*—Zarley, McKee, Thomte, Voorhees, & Sease

[57] ABSTRACT

A hub guard includes a vertical wall portion preferably semi-circular in shape covering the upper half of the interconnected hub plate and teeth mounting plate and associated bolts. In an alternative embodiment, the guard vertical wall extends down on opposite sides of the hub housing terminating in end edges spaced apart to define an access opening to the teeth mounting bolts with the width of the access opening being at least as great as the width of the hub housing to allow for mounting of the guard on the housing and removal without removal of the rake wheel.

13 Claims, 3 Drawing Sheets

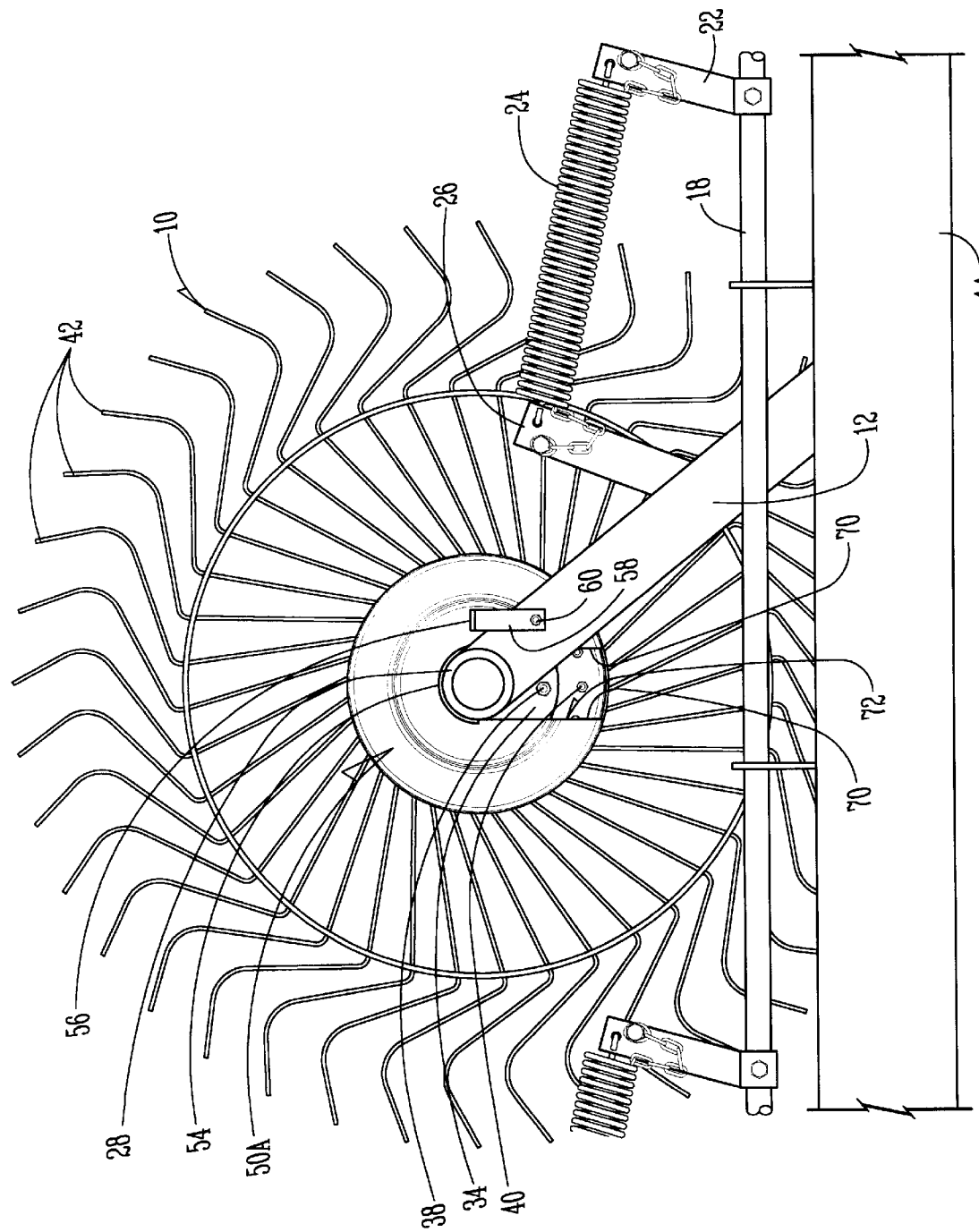

WHEEL RAKE HUB GUARD

BACKGROUND OF THE INVENTION

Hay rakes utilizing rake wheels, depending on various conditions including the wind, may experience the problem of the hay being carried around the rake wheel and falling over the top and wrapping around the shaft connecting it to a rake arm thereby damaging the bearing(s) and rendering the rake wheel inoperative.

What is needed is a guard to protect the shaft and bearing which is easily mounted on the hub housing without removal of the rake wheel and which also gives access to teeth mounting bolts connecting the rake teeth to the teeth mounting plate.

SUMMARY OF THE INVENTION

A rake wheel has a center shaft connected to a rake arm through a hub housing containing a bearing. The center shaft at its outer end is connected to a hub plate in turn connected by bolts to a tooth mounting plate which has an outer peripheral edge flared away from the teeth to allow flexure of the teeth during the raking operation.

The hub guard has a vertically oriented wall portion which extends from the hub outwardly and terminates in an inwardly flared peripheral edge which opposingly meets the peripheral edge of the tooth mounting plate to thereby deflect raked material away from the hub and center shaft. The vertical guard wall terminates at its inner end in an arcuate laterally extending flange which overlays the hub housing.

The shape of the hub guard is preferably semi-circular extending over the top half of the hub plate and the tooth mounting plate leaving exposed the bottom half for access to the mounting bolts, reducing weight on the rake arm and enabling the guard to be easily mounted on the hub housing. Alternatively, however, the guard can extend vertically downwardly leaving an access opening between the guard wall spaced apart end edges. The access opening allows removal of teeth without removing the hub guard. The horizontal width of the access opening would be at least as great as the horizontal width of the hub housing such that the hub guard could be mounted and removed from the housing by vertically positioning it on the hub housing.

A mounting bracket is provided which allows for mounting the hub guard to the wheel rake arm.

BRIEF DESCRIPTION OF THE DRAWINGS

FIG. 3 is a fragmentary side elevational view from the left side of a rake wheel in FIG. 1 showing an alternate embodiment of the hub guard extending substantially around the hub but allowing for an access opening to teeth mounting bolts.

DETAILED DESCRIPTION OF THE INVENTION

Figure 1:
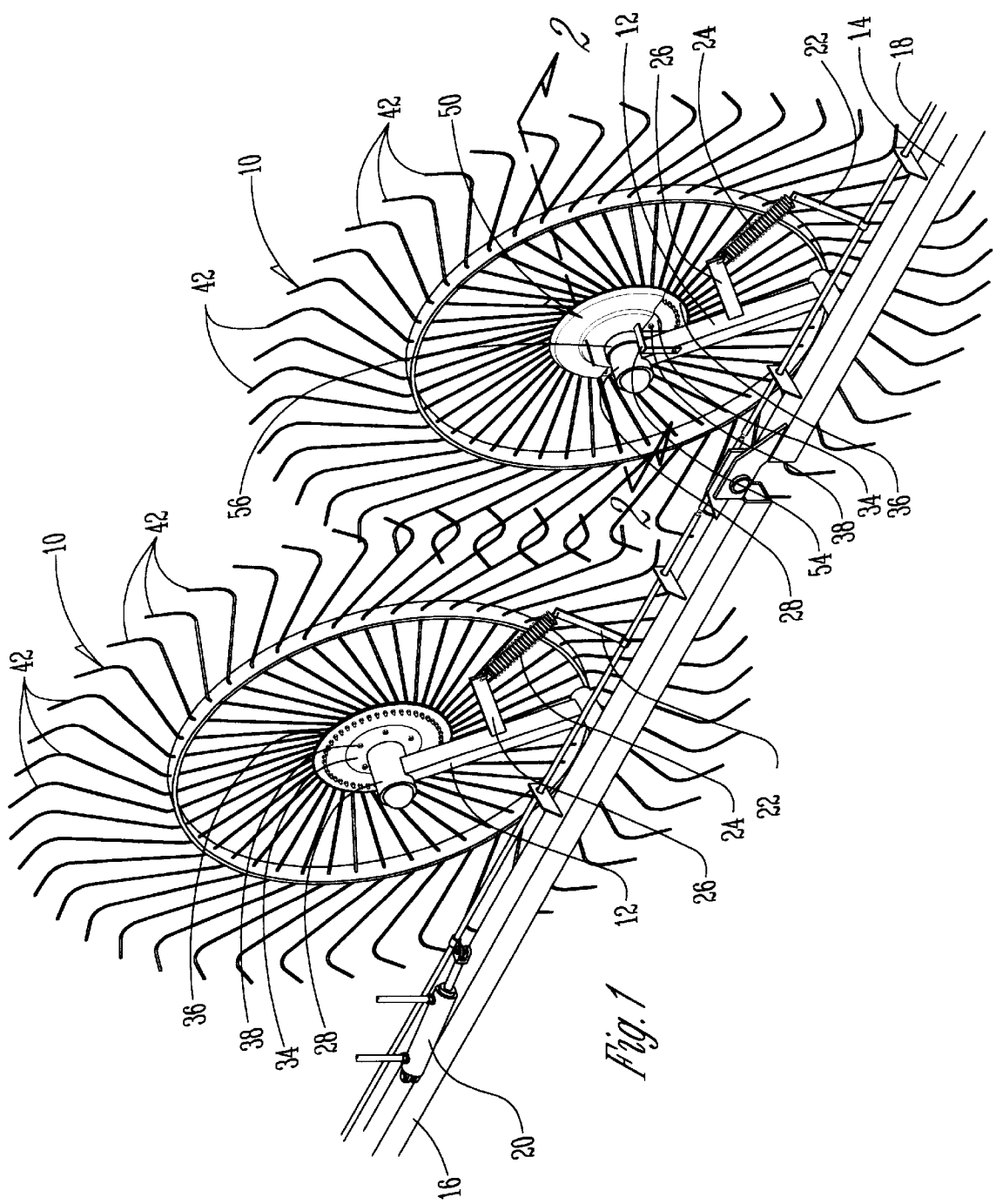
FIG. 1 is a fragmentary perspective view of rake wheels on a rake arm, one of which includes the hub guard of this invention.

The rake wheel of this invention is referred to generally by the reference numeral 10 in FIG. 1 and is shown mounted on a wheel arm 12 in turn pivotally mounted to a rake arm 14 or rake arm extension 16.

An actuating rod 18 extending along the rake arm 14 and extension 16 is connected to a hydraulic cylinder 20 for raising and lowering the rake wheels 10. The actuating rod 18 is connected to the rake wheel arms 12 by a post 22 on the rod 18 in turn connected to a spring 24 connected to a post 26 affixed to the rake wheel arm 12.

Figure 2:
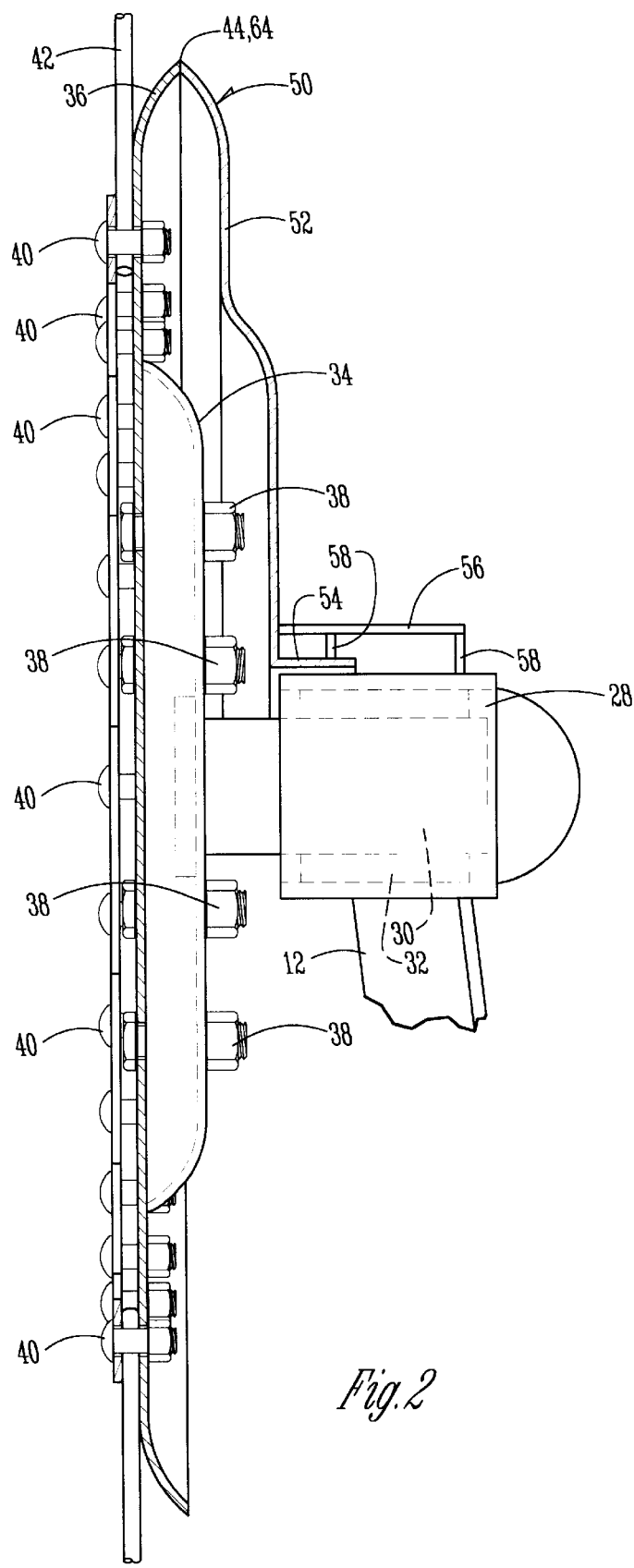
FIG. 2 is a cross-sectional view taken generally along line 2—2 in FIG. 1.

The rake wheel arm 12 is seen in FIG. 2 to be connected to a hub housing 28 enclosing a center shaft 30 mounted in bearing(s) 32. The rake wheel 10 includes a center hub plate 34 to which the center shaft 30 is connected. A teeth mounting plate 36 is connected by bolts 38 to the hub plate 34 while bolts 40 connect teeth 42 to the teeth mounting plate 36. The outer peripheral edge 44 of the teeth mounting plate 36 flares outwardly away from the teeth 42 to allow for flexure of the teeth.

A hub guard 50 includes a vertical wall portion 52 which merges at its inner end into an arcuate laterally extending flange 54 overlaying the top half of the hub housing 28. A mounting bracket 56 is connected to the wall portion 52 and includes spaced apart legs 58 which straddle the rake wheel arm 12 and are held in place by a bolt 60 seen in FIG. 3. Alternatively, the legs 58 may extend to the bottom side of the rake wheel arm 12 with the bolt 60 extending along the bottom side thereby allowing for greater adjustability.

The wall portion 52 of the hub guard 50 includes an outer peripheral edge 64 flared towards the outer edge 44 of the tooth mounting plate 36. The directly opposing outer edges 44 and 64 in a common horizontal plane prevent any rake material from passing therebetween thereby preventing any rake material from being wrapped around the hub housing 28 or gaining access to the center shaft 30 and bearing 32. While it is preferred to have the outer edges 44 and 64 in direct opposed relationship, it is also possible to prevent rake material from passing therebetween by the opposed outer edges 44 and 64 being in a nesting relationship, as for example outer edge 64 extending under outer edge 44.

The wall portion 52 of the hub guard 50 is generally complimentary in shape to the hub plate 24 and mounting bolts 38. It is seen in FIG. 1 that the hub guard 50 wall portion 52 is semi-circular in shape covering the top half of the teeth mounting plate 36 and hub plate 34 thereby allowing easy access to the teeth mounting bolts 40 exposed below the center horizontal axis of the rake wheel 10. The guard 50 may be easily mounted and removed by vertically positioning it above the hub housing 28.

An alternate embodiment 50A of the hub guard is shown in FIG. 3 and includes the wall 52 extending downwardly on either side of the hub housing 28 and terminating in opposite end edges 70 defining an access opening 72 for reaching the teeth bolts 40 and hub plate bolts 38. The horizontal width of the access opening between the end edges 70 is at least as great as the horizontal width of the hub housing 28 such that the hub guard 50A can be vertically dropped into its mounted position or removed without removing the rake wheel 10.

It is thus seen that the addition of the simple in design hub guard 50 or 50A will prevent rake material from wrapping around the hub housing 28 and gaining access to the center shaft 30 and bearing 32. Access to the teeth mounting bolts 40 is unimpeded in either of the embodiments of FIG. 2 or FIG. 3 by the bolts being exposed at least at the six o'clock position below the center shaft 30.

What is claimed is:

1. A rake wheel comprising, a center hub housing having a center shaft connected to a hub plate, a tooth mounting plate connected to said hub plate and having an outer peripheral edge, a plurality of teeth connected to said tooth mounting plate, and a stationary hub guard operatively mounted on said hub housing and including a wall portion having an outer peripheral edge in opposing relationship to said tooth mounting plate outer peripheral edge to deflect raked material away from said center shaft.

2. The rake wheel of claim 1 wherein said hub plate and tooth mounting plates are circular and concentricly interconnected by a plurality of bolts positioned in a circular pattern on said hub plate.

3. The rake wheel of claim 2 wherein said plurality of teeth are connected to said tooth mounting plate by bolts having heads covered by said hub guard wall portion.

4. The rake wheel of claim 1 wherein the outer peripheral edge of the wall portion of the hub guard being in opposing relationship to the tooth mounting plate outer peripheral edge is further defined as being in direct opposing relationship with said opposed edges being in a common horizontal plane.

5. A rake wheel comprising, a center hub housing having a center shaft, a tooth mounting circular plate connected to said center shaft and having an outer peripheral edge, and a stationary hub guard positioned on said hub housing and including a wall portion having an outer arcuate peripheral edge in opposing relationship to said tooth mounting plate outer peripheral edge to deflect raked material away from said center shaft.

6. The rake wheel of claim wherein said hub guard is substantially semi-circular in shape and extends upwardly from said hub thereby exposing said hub and tooth mounting plate below said hub guard.

7. The rake wheel of claim 6 wherein said hub guard wall portion at an end opposite said peripheral edge terminates in a laterally extending arcuate flange overlying said hub housing.

8. The rake wheel of claim wherein said arcuate flange is semi-circular in shape exposing said hub housing below said arcuate flange.

9. The rake wheel of claim 8 wherein said tooth mounting plate flares laterally outwardly away from said teeth merging into said outer peripheral edge, and said hub guard flares inwardly towards said mounting plate merging into said arcuate peripheral edge.

10. The rake wheel of claim 5 in said hub guard wall portion extends vertically over said mounting plate downwardly on opposite sides of a vertical axis through said hub housing with said mounting plate terminating in spaced apart end edges defining an access opening to said tooth mounting plate and allowing said hub guard to be vertically mounted on said hub housing without removal of said rake wheel.

11. The rake wheel of claim 5 wherein said hub guard includes a bracket adapted to connect said hub guard to a rake wheel arm.

12. The rake wheel of claim 11 wherein said bracket is U-shaped and includes spaced apart legs adapted to straddle said rake wheel arm.

13. The rake wheel of claim 10 wherein the horizontal width of said access opening between said end edges is at least as large as the horizontal width of said hub housing.

* * * * *